UNITED STATES PATENT OFFICE.

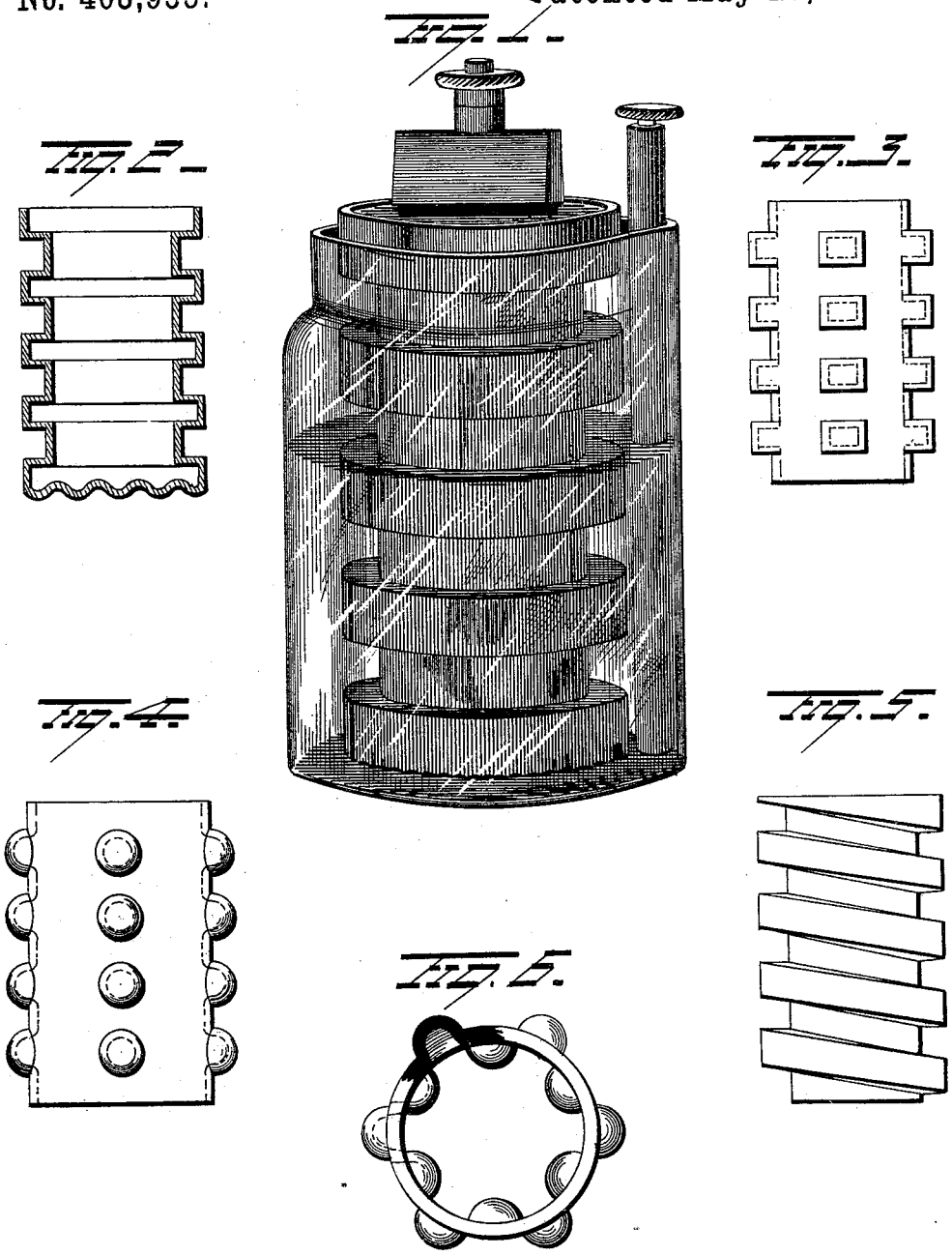

CLARENCE B. NOBLE, OF CLEVELAND, OHIO.

POROUS CUP FOR BATTERIES.

SPECIFICATION forming part of Letters Patent No. 403,955, dated May 28, 1889.

Application filed October 11, 1888. Serial No. 287,810. (No model.)

*To all whom it may concern:*

Be it known that I, CLARENCE B. NOBLE, of Cleveland, in the county of Cuyahoga and State of Ohio, have invented certain new and useful Improvements in Porous Cups for Batteries; and I do hereby declare the following to be a full, clear, and exact description of the invention, such as will enable others skilled in the art to which it appertains to make and use the same.

My invention relates to galvanic batteries, and more particularly to an improvement in porous cups used with some forms of such batteries.

In galvanic batteries a glass or earthen jar is employed to contain the several elements, which latter are separated by means of a jar or cup of porous material, usually clay, and unglazed.

In one form of such battery, known as the "Grove cell," a cylinder of zinc is placed in a dilute solution of sulphuric acid and has a conducting-wire attached thereto. Within this zinc cylinder a porous cup is immersed in the sulphuric-acid solution, said porous cup containing nitric acid. A plate of platinum is immersed in the nitric acid contained in the porous cup and provided with a conducting-wire. When the porous cup is immersed into the acid solution, it will become soaked with said solution, and thus an electric current will be permitted to pass through the cup, and with such cups as at present made, in regular cylindrical form, a considerable resistance is offered to the passage of the electric current. As is well known, when a porous diaphragm is interposed between two liquids, the process of osmose is established. This is the case with the use of the porous cup in the form of battery just mentioned, and in fact in all forms of galvanic batteries employing a porous cup to separate the liquids.

In the Grove cell a chemical action takes place between the zinc and sulphuric-acid solution and produces sulphate of zinc, while the union of the platinum and nitric acid produces a heavy brown gas—peroxide of nitrogen. The solution in the porous cup and that in the glass jar surrounding such cup being now separated by a porous shell, the process of endosmose and exosmose is established and the solutions will pass through said shell in reverse directions.

It is essential, in order to decrease the internal resistance of the battery and thereby increase the amount of electricity generated by said battery, that as little resistance as possible be afforded to the passage of the electric current through the porous cup. In batteries where but a single liquid is employed the action is very similar. For example, take the battery known as the "Leclanché cell," in which the solution is a solution of sal-ammoniac or chloride of ammonia, into which is immersed a rod or plate of zinc. Also immersed in this solution is a porous cup containing a plate of carbon surrounded by peroxide of manganese, one conducting-wire being attached to the carbon and the other to the zinc. When the parts are thus assembled, the process of endosmose is established, the ammonia solution finding its way through the porous walls of the cup to the manganese contained therein. When this solution reaches the manganese, a chemical action takes place, and the resultant mixture will find its way into the ammonia solution by the process of exosmose.

In some forms of batteries the porous cup is entirely indispensable—such, for example, as the Grove cell, which employs two liquids. It is well known that the employment of such cups in the battery produces an internal resistance, thereby limiting to a certain degree the output of the current from the battery. It is therefore desirable, in order to decrease the internal resistance and increase the output of the electric current, to so construct the porous cup that it shall present as large a surface as possible to the solutions in the battery; and it is also understood that the porous cup when plunged into the battery solution becomes a conductor simply on account of the solution wetting it all through, and consequently the more surface the porous cup presents inside and outside to the solutions in the battery the easier and more readily will the electric current pass through the porous cup, because it is the solutions of the battery which conduct the electric current through said cup.

It is the object of this invention to provide a porous cup having its walls present a large amount of surface to the solutions in the battery, and thereby enlarge the path of the electric current through the porous cup, thus decreasing the internal resistance and increasing the output of the electric current.

A further object is to produce a porous cup having an irregular surface which shall be cheap to manufacture and effective in the performance of its function.

With these objects in view my invention consists, essentially, in a porous cup for batteries having its walls so formed as to produce a considerable extent of surface to the battery solutions or elements, as hereinafter set forth, and pointed out in the claims.

In the accompanying drawings, Figure 1 is a view of a Leclanché cell having a porous cup embodying my invention. Fig. 2 is a vertical sectional view of the cup shown in Fig. 1. Figs. 3, 4, 5, and 6 are views illustrating modifications.

In Fig. 1, A indicates a glass jar of the form usually adopted for a Leclanché cell, and B a solution of sal-ammoniac. A porous cup, C, is placed in the jar and immersed in the ammonia solution, and is filled with peroxide of manganese, D, which surrounds the carbon plate F, preferably in small lumps. The carbon plate produces one electrode of the battery, and has a conducting-wire, $a$, attached thereto, while the other electrode of the battery is formed by a zinc rod or plate, E, immersed in the ammonia solution and furnished with a conducting-wire, $b$. The form of porous cup shown in this cell is made having irregularities running around or at right angles to the vertical axis of the cup, both internally and externally, and of generally cylindrical form, so that an immense surface of the cup is presented to the ammonia solution, and also to the peroxide of manganese contained in the cup; and it is evident that if the amount of surface contact be increased the conductivity of the cup will also be extended; and, further, as the conductivity of the cup is extended by such increase of surface of the cup, and as the cup depends on the solution or solutions of the battery for its conductivity, it is clear that the path for the passage of the electric current through the cup will be increased in size, consequently decreasing the resistance of the cup and rendering the output of the battery greater.

The cup is made of clay or other suitable material, and, as shown in Fig. 2, the irregularities extend around or at right angles to the vertical axis of the cup, thus producing a series of hollow flanges or ribs, $g$. The bottom surface of the cup will also preferably be grooved, corrugated, or otherwise made irregular. By this construction the interior as well as the exterior of the cup is made irregular and presents a considerable extent of surface to the elements of the battery. The irregularities running around the vertical axis of the cup can be quickly, easily, and cheaply produced by formers pressed against the surfaces of the cup, thus obviating the necessity of employing molds in the manufacture of my improved cup.

The outer surface of a cylindrical cup may be furnished with a series of hollow squared projections, $h$, as shown in Fig. 3, or in some cases the solid projections $h$ may be made to project from the outside, inside, or both sides or surfaces of the cup. Hollow rounded projections $i$ may be produced upon both faces of the cup, as shown in Figs. 4 and 5. The flanges or ribs may extend around the vertical axis of the cup in the form of a spiral, as shown in Fig. 6, if desired.

Having fully described my invention, what I claim as new, and desire to secure by Letters Patent, is—

1. A porous cup having an irregular surface internally, externally, and on its bottom, substantially as set forth.

2. In a battery, the combination, with a jar, of a porous cup having irregularities projecting at right angles to the vertical axis of the cup and adapted to separate the battery elements and produce a medium for the process of osmose, substantially as set forth.

3. The combination, with a galvanic battery, of a porous cup having a non-regular surface on both its sides and bottom, within and without, substantially as set forth.

4. The combination, with a battery, of a porous cup having sides and bottom of the same thickness throughout, the said sides and bottom being of irregular shape for presenting an enlarged area of surface to the elements within and without the porous cup, substantially as set forth.

5. The combination, with a galvanic battery, of a porous cup with walls having irregularities running around the vertical axis of the cup, substantially as set forth.

6. The combination, with a galvanic battery, of a porous cup having its sides formed irregularly around the vertical axis of the cup, substantially as set forth.

7. The combination, with a galvanic battery, of a porous cup having sides of equal thickness throughout, the said sides being shaped irregularly and running around or at right angles to the vertical axis of the cup, inside and outside, substantially as set forth.

In testimony whereof I have signed this specification in the presence of two subscribing witnesses.

CLARENCE B. NOBLE.

Witnesses:
ELLEN H. B. NOBLE,
JANE W. HUTCHINSON.